United States Patent
Chappel et al.

(10) Patent No.: US 7,216,088 B1
(45) Date of Patent: May 8, 2007

(54) SYSTEM AND METHOD FOR MANAGING A PROJECT BASED ON TEAM MEMBER INTERDEPENDENCY AND IMPACT RELATIONSHIPS

(75) Inventors: Oscar A. Chappel, New Port Richey, FL (US); Christopher T. Creel, Tampa, FL (US)

(73) Assignee: Perot Systems Corporation, Plano, TX (US)

( * ) Notice: Subject to any disclaimer, the term of this patent is extended or adjusted under 35 U.S.C. 154(b) by 830 days.

(21) Appl. No.: 09/916,088

(22) Filed: Jul. 26, 2001

(51) Int. Cl.
*G06F 11/34* (2006.01)

(52) U.S. Cl. ...................................................... 705/11

(58) Field of Classification Search ................. 705/11
See application file for complete search history.

(56) References Cited

U.S. PATENT DOCUMENTS

| | | |
|---|---|---|
| 4,684,044 A | 8/1987 | Foster |
| 4,713,775 A | 12/1987 | Scott et al. |
| 4,860,213 A | 8/1989 | Bonissone |
| 4,912,669 A | 3/1990 | Iwamoto et al. |
| 4,920,499 A | 4/1990 | Skeirik |
| 4,970,658 A | 11/1990 | Durbin et al. |
| 5,301,105 A | 4/1994 | Cummings |
| 5,390,330 A | 2/1995 | Talati |
| 5,483,443 A | 1/1996 | Milstein |
| 5,488,714 A | 1/1996 | Skidmore |
| 5,523,942 A | 6/1996 | Tyler et al. |
| 5,553,282 A | 9/1996 | Parrish et al. |
| 5,577,169 A | 11/1996 | Prezioso |
| 5,619,709 A | 4/1997 | Caid |
| 5,671,360 A * | 9/1997 | Hambrick et al. ............. 705/9 |
| 5,724,488 A | 3/1998 | Prezioso |
| 5,724,983 A | 3/1998 | Selker |
| 5,765,140 A | 6/1998 | Knudson et al. |
| 5,772,585 A | 6/1998 | Lavin |
| 5,784,635 A | 7/1998 | McCallum |
| 5,794,178 A | 8/1998 | Caid |

(Continued)

FOREIGN PATENT DOCUMENTS

JP 03-020866 1/1991

(Continued)

OTHER PUBLICATIONS

Puittinen, Rainer, Hameri Ari-Pekka, Measuring and visualizing information transfer in networked collaboration; International Journal of Communication Systems, vol. 12, No. 85, 1999, pp. 85-101.*

(Continued)

*Primary Examiner*—Tariq Hafiz
*Assistant Examiner*—Scott L. Jarrett
(74) *Attorney, Agent, or Firm*—Jenkens & Gilchrist, P.C.

(57) ABSTRACT

A system and method for determining interdependencies between project team members working on a development project. The method includes receiving data indicative of a temporal relationship between a first and a second project team member having modified at least one artifact of the development project. The data indicative of the temporal relationship between the project team members may be statistically analyzed. At least one metric representative of an interdependency relationship between the first and second project team members may be formed. The metric(s) representative of the interdependency relationship may be stored.

29 Claims, 8 Drawing Sheets

U.S. PATENT DOCUMENTS

| | | |
|---|---|---|
| 5,809,476 A | 9/1998 | Ryan |
| 5,809,493 A | 9/1998 | Ahamed et al. |
| 5,819,228 A | 10/1998 | Spiro |
| 5,826,239 A * | 10/1998 | Du et al. .................. 705/8 |
| 5,835,897 A | 11/1998 | Dang |
| 5,890,129 A | 3/1999 | Spurgeon |
| 5,903,453 A | 5/1999 | Stoddard, II |
| 5,908,383 A | 6/1999 | Brynjestad |
| 5,916,818 A | 6/1999 | Irsch |
| 5,924,074 A | 7/1999 | Evans |
| 5,930,798 A | 7/1999 | Lawler |
| 5,956,689 A | 9/1999 | Everhart, III |
| 5,960,196 A | 9/1999 | Carrier, III et al. |
| 6,049,794 A | 4/2000 | Jacobs |
| 6,061,506 A | 5/2000 | Wollaston et al. |
| 6,067,466 A | 5/2000 | Selker |
| 6,067,541 A * | 5/2000 | Raju et al. .................. 707/3 |
| 6,073,107 A | 6/2000 | Minkiewicz et al. |
| 6,082,776 A | 7/2000 | Feinberg |
| 6,088,677 A | 7/2000 | Spurgeon |
| 6,101,481 A | 8/2000 | Miller et al. |
| 6,115,646 A * | 9/2000 | Fiszman et al. .......... 700/181 |
| 6,125,350 A | 9/2000 | Dirbas |
| 6,137,911 A | 10/2000 | Zhilyaev |
| 6,151,585 A * | 11/2000 | Altschuler et al. ........... 705/10 |
| 6,161,113 A | 12/2000 | Mora et al. |
| 6,182,047 B1 | 1/2001 | Dirbas |
| 6,266,645 B1 | 7/2001 | Simpson |
| 6,272,678 B1 | 8/2001 | Imachi et al. |
| 6,278,977 B1 * | 8/2001 | Agrawal et al. .............. 705/7 |
| 6,279,042 B1 * | 8/2001 | Ouchi .................. 709/240 |
| 6,292,771 B1 | 9/2001 | Haug |
| 6,311,173 B1 | 10/2001 | Levin et al. |
| 6,314,556 B1 | 11/2001 | DeBusk |
| 6,336,217 B1 | 1/2002 | D'Anjou et al. |
| 6,347,329 B1 | 2/2002 | Evans |
| 6,353,817 B1 | 3/2002 | Jacobs |
| 6,366,683 B1 | 4/2002 | Langlotz |
| 6,370,511 B1 | 4/2002 | Dang |
| 6,381,576 B1 | 4/2002 | Gilbert |
| 6,381,610 B1 | 4/2002 | Gundewar et al. |
| 6,411,936 B1 | 6/2002 | Sanders |
| 6,415,295 B1 | 7/2002 | Feinberg |
| 6,430,538 B1 * | 8/2002 | Bacon et al. .................. 705/9 |
| 6,484,178 B1 | 11/2002 | Julian |
| 6,493,731 B1 * | 12/2002 | Jones et al. ............ 715/501.1 |
| 6,551,266 B1 | 4/2003 | Davis |
| 6,556,964 B2 | 4/2003 | Haug |
| 6,578,006 B1 * | 6/2003 | Saito et al. .................. 705/9 |
| 6,581,040 B1 | 6/2003 | Wright et al. |
| 6,594,673 B1 * | 7/2003 | Smith et al. ............. 707/104.1 |
| 6,611,726 B1 | 8/2003 | Crosswhite |
| 6,715,130 B1 | 3/2004 | Eiche et al. |
| 6,725,287 B1 | 4/2004 | Loeb et al. |
| 6,879,959 B1 | 4/2004 | Chapman et al. |
| 6,901,372 B1 | 5/2005 | Helzerman |
| 6,904,454 B2 * | 6/2005 | Stickler .................. 709/213 |
| 6,999,959 B1 | 2/2006 | Lawrence et al. |
| 7,031,930 B2 | 4/2006 | Freeman et al. |
| 7,092,895 B2 | 8/2006 | Chappel et al. |
| 2001/0018739 A1 | 8/2001 | Anderson |
| 2001/0034621 A1 | 10/2001 | Kirsh et al. |
| 2001/0037224 A1 | 11/2001 | Eldridge et al. |
| 2001/0041992 A1 | 11/2001 | Lewis |
| 2001/0051879 A1 | 12/2001 | Johnson |
| 2001/0051880 A1 | 12/2001 | Schurenberg |
| 2002/0007284 A1 | 1/2002 | Schurenberg |
| 2002/0010595 A1 | 1/2002 | Kapp |
| 2002/0022972 A1 | 2/2002 | Costello |
| 2002/0035486 A1 | 3/2002 | Huyn |
| 2002/0035491 A1 | 3/2002 | Dombroski |
| 2002/0040359 A1 | 4/2002 | Green et al. |
| 2002/0046346 A1 | 4/2002 | Evans |
| 2002/0052551 A1 | 5/2002 | Sinclair |
| 2002/0052760 A1 | 5/2002 | Munoz |
| 2002/0052858 A1 | 5/2002 | Goldman et al. |
| 2002/0069056 A1 | 6/2002 | Nofsinger |
| 2002/0069057 A1 | 6/2002 | Kapust |
| 2002/0069079 A1 | 6/2002 | Vega |
| 2002/0069085 A1 | 6/2002 | Engel |
| 2002/0069089 A1 | 6/2002 | Larkin |
| 2002/0070226 A1 | 6/2002 | Liff |
| 2002/0077849 A1 | 6/2002 | Baruch |
| 2002/0077945 A1 * | 6/2002 | Leymann et al. ............ 705/35 |
| 2002/0077994 A1 | 6/2002 | Dombroski |
| 2002/0082825 A1 | 6/2002 | Rowlandson |
| 2002/0087358 A1 | 7/2002 | Gilbert |
| 2002/0087533 A1 | 7/2002 | Norman |
| 2002/0091552 A1 | 7/2002 | Dombroski |
| 2002/0093189 A1 | 7/2002 | Krupa |
| 2002/0099686 A1 | 7/2002 | Schwartz |
| 2002/0100762 A1 | 8/2002 | Liff |
| 2002/0103680 A1 | 8/2002 | Newman |
| 2002/0107452 A1 | 8/2002 | Kwong |
| 2002/0111826 A1 | 8/2002 | Potter |
| 2002/0116466 A1 * | 8/2002 | Trevithick et al. .......... 709/206 |
| 2002/0120466 A1 | 8/2002 | Finn |
| 2002/0124002 A1 | 9/2002 | Su |
| 2002/0128816 A1 | 9/2002 | Haug |
| 2002/0128868 A1 | 9/2002 | Lonski |
| 2002/0138306 A1 | 9/2002 | Sabovich |
| 2002/0138649 A1 | 9/2002 | Cartmell |
| 2002/0147615 A1 | 10/2002 | Doerr |
| 2002/0147617 A1 | 10/2002 | Schoenbaum |
| 2002/0147710 A1 * | 10/2002 | Hu .................. 707/3 |
| 2002/0148893 A1 | 10/2002 | Walsh |
| 2002/0150966 A1 | 10/2002 | Muraca |
| 2002/0156078 A1 | 10/2002 | Comings |
| 2002/0161606 A1 | 10/2002 | Bennett |
| 2002/0165735 A1 | 11/2002 | Stangel |
| 2002/0165738 A1 | 11/2002 | Dang |
| 2002/0165739 A1 | 11/2002 | Guyan |
| 2002/0169737 A1 * | 11/2002 | Armstrong et al. ........... 706/59 |
| 2002/0169771 A1 | 11/2002 | Melmon |
| 2002/0170565 A1 | 11/2002 | Walker |
| 2002/0173875 A1 | 11/2002 | Wallace |
| 2002/0173971 A1 | 11/2002 | Stirpe |
| 2002/0173987 A1 | 11/2002 | Dang |
| 2002/0173988 A1 | 11/2002 | Dang |
| 2002/0173989 A1 | 11/2002 | Dang |
| 2002/0173992 A1 | 11/2002 | Dang |
| 2002/0174005 A1 | 11/2002 | Chappel |
| 2002/0178161 A1 * | 11/2002 | Brezin et al. .................. 707/10 |
| 2002/0183626 A1 | 12/2002 | Nordstrom |
| 2002/0187772 A1 | 12/2002 | Hyyppa |
| 2002/0188452 A1 | 12/2002 | Howes |
| 2002/0193667 A1 | 12/2002 | McNair |
| 2002/0194221 A1 | 12/2002 | Strong |
| 2002/0195488 A1 | 12/2002 | Walsh |
| 2002/0198885 A1 | 12/2002 | Streepy |
| 2003/0009239 A1 | 1/2003 | Lombardo |
| 2003/0009357 A1 | 1/2003 | Pish |
| 2003/0009359 A1 | 1/2003 | Weidner |
| 2003/0018595 A1 | 1/2003 | Chen |
| 2003/0023473 A1 | 1/2003 | Guyan |
| 2003/0027223 A1 | 2/2003 | Muraca |
| 2003/0028404 A1 | 2/2003 | Herron |
| 2003/0032069 A1 | 2/2003 | Muraca |
| 2003/0032871 A1 | 2/2003 | Selker |
| 2003/0033169 A1 | 2/2003 | Dew |
| 2003/0036924 A1 | 2/2003 | Rosen |
| 2003/0049701 A1 | 3/2003 | Muraca |
| 2003/0050804 A1 | 3/2003 | Hendershot |
| 2003/0050825 A1 | 3/2003 | Gallivan |

| | | |
|---|---|---|
| 2003/0055531 A1 | 3/2003 | Liff |
| 2003/0055679 A1 | 3/2003 | Soll |
| 2003/0060688 A1 | 3/2003 | Ciamiello |
| 2003/0061096 A1 | 3/2003 | Gallivan |
| 2003/0069756 A1 | 4/2003 | Higginbotham |
| 2003/0069760 A1 | 4/2003 | Gelber |
| 2003/0074218 A1 | 4/2003 | Liff |
| 2003/0074226 A1 | 4/2003 | Rostron |
| 2003/0074228 A1 | 4/2003 | Walsh |
| 2003/0078813 A1 | 4/2003 | Haskell et al. |
| 2003/0083903 A1 | 5/2003 | Myers |
| 2003/0101089 A1 | 5/2003 | Chappel et al. |
| 2003/0130991 A1 | 7/2003 | Reijerse et al. |
| 2003/0149594 A1 | 8/2003 | Beazley et al. |
| 2003/0167184 A1 | 9/2003 | Kole |
| 2003/0191667 A1 | 10/2003 | Fitzgerald et al. |
| 2003/0208379 A1 | 11/2003 | Haskey et al. |
| 2004/0006495 A1 | 1/2004 | Dudley |
| 2004/0073811 A1 | 4/2004 | Sanin |
| 2004/0078247 A1 | 4/2004 | Rowe et al. |
| 2004/0122709 A1 | 6/2004 | Avinash et al. |
| 2005/0102169 A1 | 5/2005 | Wilson |
| 2005/0137912 A1 | 6/2005 | Rao et al. |

FOREIGN PATENT DOCUMENTS

| | | |
|---|---|---|
| JP | 2000-250888 | 9/2000 |
| JP | 2001-022729 | 1/2001 |

OTHER PUBLICATIONS

Hameri, Ari-Pekka et al., Spin-offs from CERN and the Case of TuoviWDM Technovation, 2000, vol. 20, No. 2, pp. 71-80.*
Hameri, AP et al., Improved project management through improved document management Computers in Industry, 2001, vol. 45, pp. 231-243.*
Hameri, AP et al., Distributed New Product Development Project Based on Internet and World-Wide Web: A Case Study Product Innovation Management, 1997, vol. 14, pp. 77-87.*
Hameri, Ari-Pekka, Project management in a long-term and global one-of-a-kind project International Journal of Product Management, 1997, vol. 15, No. 3, pp. 151-157.*
Amami, Mokhtar, et al., Project Management and Communication of Product Development Through Electronic Document Management, Project Management Journal, Jun. 2000, vol. 31, No. 2, pp. 6-19.*
Krackhardt, David, Social Networks and the Liability of Newness for Managers Trends in Organization Behavior, vol. 3, 1996, pp. 159-173.*
Morelli, Mark et al., Predicting Technical Communication in Product Development Organizations IEEE Transactions on Engineering Management, Aug. 1995, vol. 42, No. 3, pp. 215-222.*
Katz, Ralph et al., Communication Patterns, Project Performance and Task Characteristics Organizational Behavior and Human Performance, 1979, vol. 23, No. 2, Abstract.*
Krackhardt, David, Informal networks: the company behind the chart Harvard Business Review, Jul. 1993, vol. 74, No. 4, Abstract.*
Wasserman, Stanley et al., Social Network Analysis: Methods and Applications Cambridge University Press, 1994, ISBN: 0-521-38707-8.*
Vuoikoski, Mikko, Making intercorporate project communications work Single Source Oy, Unkown Date, pp. 1-13.*
Simmons, Dick B., Communications: a software group productivity dominator Software Engineering Journal, Nov. 1991, pp. 454-462.*
Simmons, Dick B., A Win-Win Metric Based Software Management Approach IEEE Transactions on Engineering Management, Feb. 1992, vol. 39, No. 1, pp. 32-41.*
Simmons, Dick B. et al., Manager Associate IEEE Transactions on Knowledge and Data Engineering, Jun. 1993, vol. 5, No. 3, pp. 426-438.*
Mehul, Shah A., ReferralWeb: A Resource Location System Guided by Personal Relations Massachusetts Institute of Technology, May 1997.*
Jones, Gregory James, A Study of Communications between Subject Matter Experts and Individual Students in Electronic Mail Context, Dissertation, University of Texas at Austin, May 2001.*
Benson, Peter Jackson, A Field Study of Communication Patterns in an Organization Using NEGOPY Computerized Network Analysis Technique, University of Denver, 1987, ATA 8728711, Abstract.*
Ackerman, Mark et al., Social Activity Indicators UIST 1999, Nov. 1995, pp. 159-168.*
Chapter Four Managing Core Competencies of the Corporation—Tactic #17, Organizational Network Mapping 1996, Retrieved from http://www.orgnet.com/orgnetmap.pdf Jun. 19, 2006.*
Smith, Marc et al., Visualization Components for Persistent Conversations CHI 2001, Mar.-Apr. 2001, vol. 3, No. 1, pp. 136-143.*
Krebs, Valdis, Organizational Network Analysis Feb. 2001, Orgnet. com, Retrieved from Archive.org Jun. 19, 2006.*
Garton, Laura et al., Studying On-Line Social Networks Chapter 4, Doing Internet Research, Steven Jones Editor, Sage Publications, 1999, pp. 75-105.*
McCord, Kent R. et al., Managing the Integration Problem in Concurrent Engineering Massachusetts Institute of Technology, Sloan School of Management Working Paper, Aug. 1993.*
Thomas, Stephen Richard, An assessment tool for improving project team communications The University of Texas at Austion, 1996, AAT 9719508.*
Sosa, Manuel E. et al., Understanding the Effects of Product Architecture on Technical Communication in Product Development Organizations, Massachusetts Institute of Technology, Sloan School of Management Working Paper, Aug. 2000.*
Allen, Thomas, Architecture and Communication Among Product Development Engineers Proceedings of the IEEE Engineering Management Society, 2000.*
Simmons et al., Software Measurement: A Visualization Toolkit Hewlett-Packard Profession Book Series, ISBN: 0-13-840695-2.*
The Economist; "*The big picture*"; Geneva; Jan. 4, 2001; pp. 1-3; internet www.economist.com/displayStory.dfm?Story_ID=463720.
U.S. Appl. No. 10/336,104, Chappel.
U.S. Appl. No. 10/690,257, Chappel.
U.S. Appl. No. 10/690,258, Chappel.
U.S. Appl. No. 09/916,088, Creel et al.
Digital Business Office Architecture; 2001 The Technical Resource Connection, Inc.; 1 Page.
Tips for Clean Claims for Institutional Providers; 3 Pages.
Health Claims for Equivalent Encounter Information; HCFA Uniform Bill-92 (UB-92), Version 4.1; 28 Pages.
New Area PPO Puts Emphasis on Claims Service; Alan Moorse; Capital District Business Review; 2 Pages.
Object Oriented Programming; A Guide for the Beginner- from Modula-2 to Java; 9 Pages.
Rules Based Systems Fuzzy Logic Expert Systems Forwards and Backwards Chaining Pattern Matching Imperative and Declarative Programming; Gaurav Sharma et al.; 13 Pages.
AMR Health's—AVS Reimbursement System; 3 Pages.
Introduction; 2 Pages.
Designing an Expert System; 1 Page.
Expert System Architecture; 2 Pages.
Choosing a Problem; 1 Page.
Knowledge Engineering; 1 Page.
Exam-like Questions; 1 Page.
Rules and Expert Systems; 1 Page.
A Simple Example; 2 Pages.
Explanation Facilities; 2 Pages.
More Complex Systems; 1 Page.
An Expert System Shell in Prolog; 4 Pages.
MYCIN: A Quick Case Study; 3 Pages.
Knowledge-Based System; 1 Page.
Expert System; 1 Page.
Inference Engine; 1 Page.
Inference Rule; 1 Page.
Object Code; 1 Page.
Rule-Based Systems; 1 Page.
Forward Chaining Systems; 3 Pages.

Backward Chaining Systems; 2 Pages.

Forwards vs. Backwards Reasoning; 1 Page.

Uncertainty in Rules; 1 Page.

Makridakis, Spyros et al., Forecasting Methods and Applications Third Edition, John Wiley & Sons, 1998, ISBN: 0-471-53233-9.

Turban, Efraim et al., Decision Support Systems and Intelligent Systems—Fifth Edition, Prentice Hall, Inc., 1998, ISBN: 0-13-740937-0.

Bell et al., The Forecasting Report, Sep. 1999.

Armstrong, Scott J., Strategic Planning and Forecasting Fundamentals, 1983, Excerpt from Albert, Kenneth, The Strategic Management Handbook, McGraw Hill.

Armstrong, J. Scott et al., Principles of Forecasting—A Handbook for Researchers and Practitioners, Springer, Apr. 2001, ISBN: 0792374010.

Armstrong, J. Scott et al., Principles of Forecasting—Web Site, Jan. 2001, www.passig.com/pic/ForecastingHandbook.htm.

ForecastPro.com—Home, Product Description and Product Review web pages, Nov. 2000, Retrieved Apr. 15, 2005 from Archive.org.

Hollander, Geoffrey, ForecastPro Presages Data, InfoWorld, Feb. 2000.

Stellwagen, Eric, New Version of Forecast Pro Greatly Expand Capabilities, Performance and East of Use, Business Forecast Systems, Inc., Press Release, Feb. 2000.

Coffee, Peter, Forecast Pro XE Sharpens Users' View, PC Week Labs, Feb. 2000.

Armstrong, Scott J. et al., Forecasting for Marketing, Excerpt from Hooley et al., Quantitative Methods in Marketing, Second Ed, 1999, pp. 92-119.

Delurgio, Steve, Guide to Forecast Pro for Windows, Retrieved from forecast.umkc.edu, Apr. 2005.

Forecast Pro Product Brochure, Retrieved Apr. 19, 2005 from Archive. org—www.forecastpro.com.

Jain, Chaman, Benchmarking Forecasting Software Packages and Systems, Insititute of Business Forecasting Research Report 32, Retrieved Apr. 19, 2005, from Archive.org—www.forecastpro.com.

Khairy A.H. Kobbacy et al., "Towards the Development of an Intelligent Inventory Management System", ProQuest, vol. 10, No. 6, 1999, 11 pages.

Walter Reitman et al., "Artificial Intelligence Applications for Business", Ablex Publishing Corporation, Jan. 1984, pp. 114-118, 135-137.

Evelina Lamma et al., "AI*AI 99: Advances in Artificial Intelligence", Sep. 1999, pp. 25-34, 36.

Jae K. Shim, "The Complete Guide to Forecasting Real World Company Performance: Strategic Business Forecasting", CRC Press, 2000, pp. 131-139, 141-145, 147-158, 267.

Derek Partridge et al., "Artificial Intelligence: Business Management", Ablex Publishing Corporation, 1992, pp. 154-158, 185-188, 197-198, 279, 282-285, 298.

K. S. Leung et al., "Fuzzy Concepts in Expert Systems", IEEE, vol. 21, No. 9, Sep. 1988, pp. 43-56.

H. C. Harrison et al., "An Intelligent Business Forecasting System", Proceedings of the 1993 ACM Conference on Computer Science, 1993, pp. 229-236.

"Autobox 5.0 For Windows: User's Guide & Reference Guide", Dec. 10, 1999, pp. 1-65.

"Smart Software: Enterprise Forecasting Solutions", May 2000-Jul. 2001, pp. 1-36.

Bryan Marvin, "Predicting the Future Proves Easy with Forecast Pro Planner (Software Review)", PC Week, vol. 4, No. 35, Sep. 1, 1987.

Juan C. Nogueira et al., "A Formal Risk Assessment Model for Software Evolution", US Army Research Office under grant #38690-MA & grant #40473-MA.

Michael K. Daskalantonakis, "A Practical View of Software Measurement and Implementation Experiences Within Motorola", IEEE Transactions on Software Engineering, vol. 18, No. 11 Nov. 1992, pp. 998-1010.

Edward F. Weller, "Using Metrics to Manage Software Projects", IEEE, Sep. 1994, pp. 27-33.

Dick B. Simmons et al., "Software Measurement: A Visualization Toolkit for Project Control and Process Improvement", Prentice Hall, Nov. 1997, ISBN-0-13-840695-2.

"Caliber—Requirements Management (RM)", Http://web.archive.org/web/20000304023307/www.tbi.com/caliberrm/index.html.

H.P. Schultz, "Software Management Metrics", Mitre Corp. Report No. M88-1, May 1988 (abstract).

Karl E. Wiegers, "Automating Requirements Management", Process Impact, 1999, pp. 1-6.

Bruce Abbott, "Requirements Set the Mark", Info World, Mar. 5, 2001, pp. 45-46.

Andy Feibus, "Manage Your Project's Requirements", Information Week, Oct. 19, 1998, pp. 100-108.

QSS Delivers Industry's First Enterprise-Wide Requirements Management Suite for E-Business, QSS News Archive, Mar. 22, 2000.

D. W. Cordes, "Evaluation Method for User Requirements Documents", Information and Software Technology, May 1989, vol. 31, issue 4, pp. 181 (8 pages) (abstract).

J. Gyorkos, "Measurements in Software Requirements Specification Process", Microprocessing and Microprogramming, Dec. 1994, vol. 40, issue 10-12, p. 893 (4 pages) (abstract).

Rita Jean Costello, "Metrics for Requirements Engineering", California State University, 1994, 211 pages (abstract).

Jeanne Minahan Robinson, "Risk Assessment in Software Requirements Engineering: an Event Driven Framework", George Mason University, 1995, 177 pages (abstract).

Donald M. York, "An Early Indicator to Predict Requirements Volatility", George Mason University, 2001, 235 pages (abstract).

D. Pfahl et al., "Using Simulation to Analyze the Impact of Software Requirement Volatility on Project Performance", Information and Software Technology, Nov. 15, 2000, vol. 42, issue 14, p. 1001.

Capers Jones, "Strategies for Managing Requirements Creep", Software Productivity Research, Jun. 1996, pp. 92-94.

Adam A. Porter et al., "Empirically Guided Software Development Using Metric-Based Classification Trees", IEEE Software, Mar. 1990, pp. 46-54.

Max Lupul, "Forecast Pro for Windows, Version 1.1: What Does it Do?", Journal of Services Marketing, vol. 7, No. 4, 1993, pp. 67-69.

Geoffrey Hollander, "Forecast Pro Preasges Data", Infoworld, Feb. 21, 2000, vol. 22, No. 8, pp. 59-60.

John T. Mentzner et al., "Evaluating a Decision Support Forecasting System", Industrial Marketing Management, vol. 18, 1989, pp. 313-323.

Marco Carrer et al., "An Annotation Engine for Supporting Video Database Population", Multimedia Tools and Applications 5, Kluwer Academic Publishers, 1997, pp. 233-258.

Robert Gaizauskas et al., "Information Extraction: Beyond Document Retrieval", Computational Linguistics and Chinese Language Processing, vol. 3, No. 2, Aug. 1998, pp. 17-60.

Gian P. Zarri, "NKRL, a Knowledge Representation Language for Narrative Natural Language Processing", 1996, pp. 1032-1035.

"FastEMC 6.2: UB92 Electronic Claim Submission System", IPTechnologies, Oct. 31, 1999, manual.

R. Shaker et al., "A Rule Driven Bi-Directional Translation System for Remapping Queries and Result Sets Between a Mediated Schema and Heterogeneous Data Sources", pp. 1-5.

Daniel T. Heinze et al., "LifeCode—A Deployed Application for Automated Medical Coding", AI Magazine, Summer 2001, pp. 1-12.

Ali A. Shah et al., "The Production of Accurate Construction Cost Estimates in Saudi Arabia", Cost Engineering, August 1992, vol. 34, No. 8, pp. 15-24.

Spyros Makridakis, "Accuracy Measures: Theoretical and Practical Concerns", International Journal of Forecasting, vol. 9, No. 4, Dec. 1993, p. 527-529.

Raymond A. Paul et al., "Software Metrics Knowledge and Databases for Projected Management", IEEE Transactions on Knowledge and Data Engineering, vol. 11, No. 1, Jan./Feb. 1999, pp. 255-264.

Ching-Seh Wu, "Software Project Plan Tracking Intelligent Agent", Dissertation, Texas A&M University, Dec. 2000.

Mario Alberto Garcia Espinosa, "Intelligent Agents Applied to Software Management", Texas A&M University, Dissertation, Aug. 1997.

Rational RequistiePro: Product Overview, Rational.com, retrieved from Archive.org.

Forecast Pro Product Brochure: Fast, Easy, Accurate Forecasting, Business Forecast Systems, 2000, pp. 1-12.

G. Libert, "The M-Competition With a Fully Automatic Box-Jenkins Procedure", Journal of Forecasting, Jul.-Sep. 1984, vol. 3, No. 3, pp. 325-328.

Pamela Texter, "Automatic Forecasting of Multivariate Time Series", Pennsylvania University, 1986, AAT 8705423, abstract only.

M. Hashem Pesaran et al., "A Generalized R Squared Criterion for Regression Models Estimated by the Instrumental Variables Method", Econometrica, vol. 62, No. 3, May 1994, abstract only.

Leonard Tashman et al., "Automatic Forecasting Software: A Survey and Evaluation", Pennsylvania University, 1986, AAT 8705423, abstract only.

Nagata Yasushi et al., "Comparison of Determination Coefficient Estimators in the Linear Regression Analysis", Hinshitsu, vol. 27, No. 2, 1997, abstract only.

Elvezio Ronchetti, "Regression and Time Series Model Selection", Journal of the American Statistical Association, Sep. 2000, vol. 95, No. 451, pp. 1008-1009.

Chris Chatfield, "Time-Series Forecasting", Chapman & Hall/CRC, Oct. 25, 2000, ISBN: 1584880635.

Allan D. R. McQuarrie et al., "Regression and Time Series Model Selection", World Scientific, Aug. 1998, ISBN: 981023242X.

Beiyao Zheng, "Summarizing the Goodness of Fit of Generalized Linear Models for Longitudinal Data", Journal of Statistics in Medicine, vol. 19, No. 10, 2000, abstract only.

Rational RequisitePro—User's Guide Version 4.5, Rational, 1999.

* cited by examiner

PROJECT SUMMARY DATA RECORD

| ARTIFACT ID | LEVEL | TYPE | CREATION DATE/TIME | | MODIFICATIONS DATE/TIME | | USER |
|---|---|---|---|---|---|---|---|
| 1.0 | 1 | BRANCH | 5/27/01 | 09:04:03 | | | C |
| 1.1 | 2 | BRANCH | 5/27/01 | 11:16:47 | | | C |
| 1.1.1 | 3 | BRANCH | 5/27/01 | 14:42:08 | | | C |
| 1.1.1.1 | 4 | LEAF | 5/30/01 | 08:42:40 | | | C |
| 1.1.1.1 | 4 | LEAF | 5/30/01 | 08:42:40 | 5/30/01 | 10:05:06 | C |
| 1.1.1.1 | 4 | LEAF | 5/30/01 | 08:42:40 | 5/31/01 | 13:08:42 | D |
| 1.1.1.1 | 4 | LEAF | 5/30/01 | 08:42:40 | 5/31/01 | 15:18:26 | D |
| 1.1.1.1 | 4 | LEAF | 5/30/01 | 08:42:40 | 6/01/01 | 08:45:15 | D |
| 1.1.1.1 | 4 | LEAF | 5/30/01 | 08:42:40 | 6/01/01 | 09:17:36 | C |

*FIG. 2*

SYSTEM AND METHOD FOR MANAGING A PROJECT BASED ON TEAM MEMBER INTERDEPENDENCY AND IMPACT RELATIONSHIPS

RELATED CASES

This application is related to co-pending U.S. patent applications Ser. No. 09/760,339 and Ser. No. 09/859,320, which are incorporated herein by reference.

BACKGROUND

1. Field of the Invention

The present invention relates generally to project management, and, more particularly, but not by way of limitation, to analyzing interdependencies between project team members.

2. Background of the Invention

Understanding interaction and interdependency relationships between project team members working on a development project is often difficult for a project manager. Development projects, such as a requirements specification or a proposal document, often have 10 to 50 or more project team members who author, edit, and manage the development project. While project managers have various tools to monitor and assess the progress of the development project, interdependency relationships between project team members, and impact that one project team member has on another project team member, are much more difficult to quantitatively assess and interpret.

During the execution of a development project, it is often recognized that the project begins to fall behind schedule. Typically, when the project manager recognizes that the project is slipping behind schedule, resources are added to work on tasks that require completion. However, by adding additional resources (e.g., project team members) to the development project, additional intercommunication between the new and old project team members is required as the new project team members initially face a steep learning curve to understand the development project and their role in completing the development project. The combination of the learning curve and intercommunication creates inefficiencies during the development project because original project team members are subject to devoting time and resources in assisting new project team members.

A curve may be formed to mathematically describe completion time for a development project and the number of project team members working on the development project. Such a curve may show a large amount of time required to complete a project with only a few project team members. As the number of project team members increases, the amount of time to complete the development project decreases, but upon adding too many project team members, the amount of time that the project team takes to complete the development project begins to increase. The increase occurs because inefficiencies are created due to added communication and interdependency relationships between the project team members. It has been shown that communicational complexity increases by $n(n-1)/2$, where n is the number of project team members that must communicate in order to complete the development project. Interdependency relationships are formed as project team members perform certain roles or job functions that require one project team member to work on matters created, defined by, or previously worked on by a second project team member.

In large project developments, it is often impractical or extremely difficult to recognize that problems with interdependency relationships exist between the project team members. One reason that makes it difficult to recognize interdependency relationship problems is that day-to-day interactions and work efforts between project team members are generally at a level to which project managers are not exposed. For example, a senior project team member of a proposal team may often be casually supervising several junior team members by assisting in writing and/or editing duties during the course of the development project. However, the extent of the supervisory role by the senior project team member may not be fully understood or appreciated by the project manager as the supervisory role is not a planned duty of the senior member, but simply a professional courtesy—a role not anticipated to have an impact on the development project. In other words, the supervisory role is an unintended consequence of including junior project team members on a complex project. And, without expressly notifying the project manager of the supervision being provided by the senior project team member to the junior project team member(s), the inefficiencies created due to added interdependency relationships cannot be properly managed by the project team manager. Also, impact on one project team member due to work performed by another project team member is difficult to quantitatively assess. Admittedly, identifying interdependency relationships between the project team members is an overwhelming and difficult task.

SUMMARY OF THE INVENTION

To overcome the difficulty of being unable to easily quantitatively assess interdependency and impact relationships between project team members, statistical analysis may be utilized to assess the interdependency and impact relationships between the project team members based on a temporal relationship of performing work on artifacts, such as data records (e.g., branches and leaves of a document) or data files, by the project team members. The statistical analysis may include performing a regression analysis and developing correlation coefficients to indicate the strength of the interdependency relationships between the project team members. By utilizing such statistical analysis, a project team manager may quantitatively view the interdependency relationships between the project team members and determine how to improve efficiencies for the project team.

One embodiment according to the principles of the present invention includes a system and method for determining interdependencies between project team members working on a development project. The method includes receiving data indicative of a temporal relationship between a first and a second project team member having modified at least one artifact of the development project. The data indicative of the temporal relationship between the project team members may be statistically analyzed. At least one metric representative of an interdependency relationship between the first and second project team members may be formed. The metric(s) representative of the interdependency relationship may be stored.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2 is an exemplary project summary data record describing operations performed on the development project of FIG. 1;

DETAILED DESCRIPTION OF THE DRAWINGS

Figure 1:
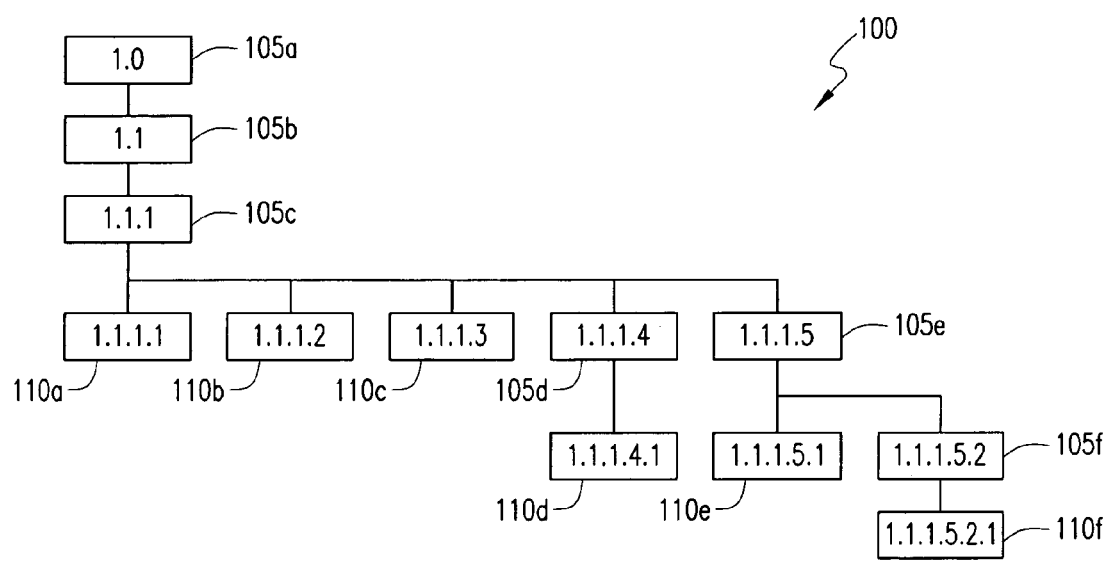
FIG. 1 is an exemplary block diagram of a development project represented in a tree structure.

The principles of the present invention will now be described more fully hereinafter with reference to the accompanying drawings, in which embodiments of the principles of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Development projects require project team members to manage, produce, edit, organize, and assemble the development project. The development project may be a requirements document (e.g., specification), request for proposal, proposal, book, periodical, software source code, accounting system, or any other document or specification that may be developed and/or maintained by the project team members.

To successfully complete the development project in what often is an aggressive schedule, efficiency of production and cooperation among project team members is desired. However, managing a group of project team members having a diverse range of personalities and work habits is difficult to comprehend by traditional management techniques, such as casual observation and meetings. Quite often, working or interdependency relations between project team members may not be fully appreciated without "micromanaging"—a less than desirable way to manage a development project. And, without the manager of the development project appreciating the interdependency relationship between project team members, inefficiencies develop, and planned costs and schedules may not be achieved.

In the case of producing a requirements specification or other similar document, one or more authors and often one or more editors are generally required. An author is considered a producer, and an editor is considered a consumer of the author's work. Therefore, an interdependency relationship is formed between the author and the editor of the author's work.

Determining the strength of the interdependency relationships between project team members without quantifying the strength of the relationships leaves a manager of the development project with a near-impossible situation to fully comprehend the working environment dynamics of the development project. For example, two project team members may dislike one another, but still produce a good specification. A subjective viewpoint of this situation might define the relationship between the working team members as a "weak" working relationship. To avoid subjective working relationship definitions, the definition of strength may be limited to the relationship between a work unit that one project team member completes with a work unit that another project team member completes. For example, an author may produce an artifact (e.g., section) within a requirements specification and an editor may edit the artifact to ensure proper spelling, grammar, and technical accuracy. The editor of the artifact is thus said to be dependent on the author. Another example may include a software system designer structuring a software application and a lower level software developer writing the software code of the software application.

Because development projects are generally located on computers, including computer networks, data indicative of the project team members who work on (e.g., create, modify, edit, etc.) artifacts of the development project may be maintained in an audit trail. The data provides a temporal relationship between a first and a second project team member that accesses the artifacts of the development project. Three exemplary utilizations of the maintained data include: (i) individual work analysis, (ii) course pairwise work analysis, and (iii) fine-grained pairwise work analysis. The individual work analysis is performed by statistically analyzing work performed by a project team member. The course pairwise work analysis is performed by a statistical analysis of types of artifacts worked on by one project team member as temporally related to work done by another project team member. The fine-grained work analysis is performed by a statistical analysis of particular artifacts worked on by one project team member as temporally related to work done on the same artifacts by another project team member. In performing either pairwise work analysis, the data may be statistically analyzed to form a metric that quantitatively represents an interdependency relationship between the first and second project team members. Further, impact created on one project team member due to work performed by another project team member may be quantitatively generated. The statistical analysis may include regression analysis and correlation. Correlation coefficients produced by the statistical analysis may provide quantitative results for the project manager of the development project to utilize in understanding strengths of the interdependency relationship between the two project team members.

FIG. 1 is an exemplary block diagram 100 showing a tree structure for the organization of a development project. The tree structure includes artifacts described as branches 105a–105f and leaves 110a–110f, cumulatively 105 and 110, respectively. An artifact may be a branch or a leaf in the context of the development project or any other data structure or data file based on a particular application. The numbers shown in the branches 105 and leaves 110 are representative section numbers within the development project. Text for each of the sections of the development project may additionally be included. It should be understood that the data for forming the tree structure may be produced on a system that uses ASCII text, Extended Markup Language, or any other data format for creating and storing a development project.

FIG. 2 is an exemplary project summary data record 200 for storing or accounting for information indicative of modifications to artifacts of the development project of FIG. 1. The information stored in the project summary data record 200 includes an artifact ID (i.e., section of the development project), level of the artifact within the tree, type of artifact, creation data of the artifact, modification time-stamp of the artifact, and user who performs the creation or modification of the artifact. The artifact may be a data object of the development project or a datafile being part of or not part of a development project. In the project summary data record 200, artifact 205a, includes artifact ID 1.1.1.1, which was created on May 30, 2001 and modified five times thereafter. User C ("C") modified the artifact 205a on May 30, 2001 at 10:05:06. User D ("D") modified the artifacts 205b–205d on May 31, 2001 at 13:08:42, May 31, 2001 at 15:18:26, and Jun. 1, 2001 at 08:45:15, respectively. C again modified the artifact 205e on Jun. 1, 2001 at 09:17:36. Accordingly, two temporal relationships are established between C and D, (i) D is a successor to C by modifying the artifacts 205b–205d, and (ii) C is a successor to D by modifying the artifact 205e. These temporal relationships between C and D provide knowledge that may be utilized to formulate a quantitative understanding of the interdependency relationship between C and D by utilizing statistical analysis. Also, impact relationships are established between C and D by: (i) determining the amount of work performed by D after C performed work on the artifact 205a (i.e., three), and (ii) the amount of work performed by C after D performed work on the artifact 205d (i.e., one). Alternatively, other parameters may be used to determine the amount of work performed, such as time performing work or time span.

Figure 3:
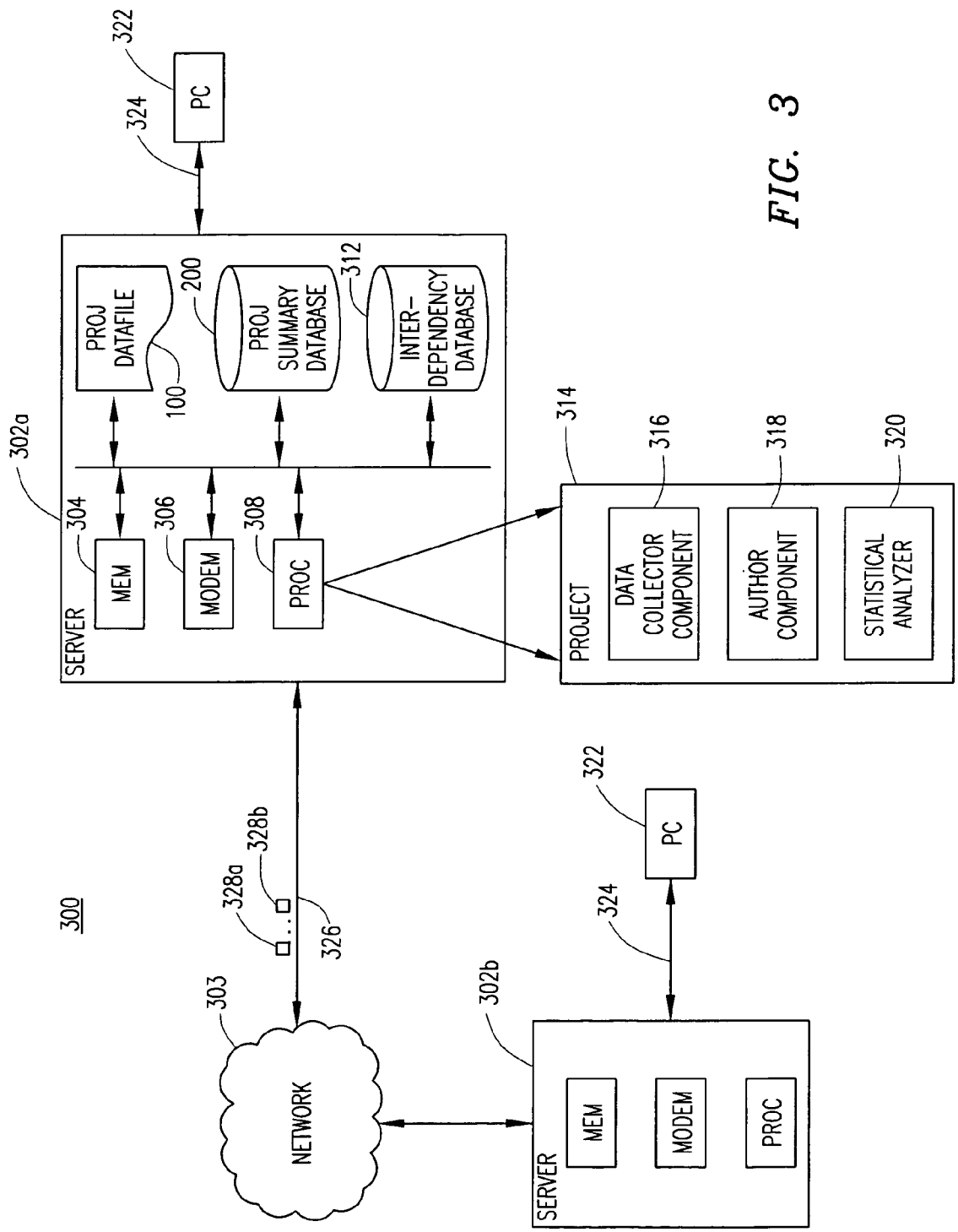
FIG. 3 is an exemplary system for maintaining and performing the principles of the present invention as applied to the development project of FIG. 1.

FIG. 3 is an exemplary system 300 for operating the principles of the present invention. A first and second server 302a and 302b are connected to a network 303, where the network 303 may be an intranet, the Internet, a local area network (LAN), or a wide area network (WAN). The server 302a includes a memory 304, a modem 306, and a processor 308. A data bus 310 provides for communication between the components within the server 302a. In an alternate embodiment, the servers 302a and 302b may be computer systems (e.g., personal computers) other than servers.

A project data file 301 representative of the data of the artifacts 105 and 110, for example, may be stored in the server 302a. The project summary database 200 is used to store the information indicative of modifications to the artifacts of the project data file 301. Further, an interdependency database 312 is used to store statistics produced by a project component 314 containing software tools that are executed on the processor 308.

The project component 314 may include a data collector component 316, an author component 318, and a statistical analyzer component 320. Alternatively, the software tools may be configured so as to be external from the project component 314. The data collector 316 is used to monitor modifications or work performed on artifacts of the project data file 301 by the project team members. Upon determining that a project team member modifies any artifact 105 and 110 of the project data file 301, the data collector component 316 updates the project summary database 200. Alternatively, the data collector 316 may perform data collection duties on a periodic basis or non-periodic basis. The statistical analyzer 320 may be employed manually or automatically by the author component 318 to utilize the data stored in the project summary database 200 to formulate information about the interdependency and impact relationships between the project team members performing work on the artifacts 105 and 110.

A personal computer (PC) 322 may be coupled to each of the servers 302a and 302b via lines 324 for interaction with the project 314. Alternatively, the personal computers 322 may be terminals that are driven by the servers 302a and 302b. Data may be communicated from the servers 302a and 302b across line 326 over the network 303 via data packets 328a and 328b as understood in the art.

Before further discussing the principles of the present invention, one embodiment to perform the statistical analysis is discussed. Regression analysis is used to determine dependency between an independent and a dependent variable. For the instant case, a project team member having a role of an author may be treated as the independent variable and a project team member having a role of an editor may be treated as the dependent variable. By definition, the author writes information stored in an artifact before the editor edits the information stored in the artifact. Therefore, because of the temporal relationship, the work performed by the author is the independent variable and the work performed by the editor is the dependent variable.

In performing the regression analysis, statistical equations are used to perform the regression analysis. The regression analysis includes normal regression model equations (equations 1–3) and further includes (i) slope (equation 4) of the regression model equations, (ii) intercept (equation 5) of the regression model equations, (iii) correlation coefficient (equation 6) of the regression equations, and (iv) an alternate equation for the correlation coefficient (equation 7) of the regression equations. The regression analysis is used to compute the regression parameters, develop models of the relationship between project team members, and assess the strength of the relationships between the project team members. The equations are expressed as:

$$S_{XX} = \Sigma X_i^2 - (\Sigma X_i)^2/n \tag{1}$$

$$S_{YY} = \Sigma Y_i^2 - (\tau Y_i)^2/n \tag{2}$$

$$S_{XY} = \Sigma XY_i - (\Sigma X_i)(\Sigma Y_i)/n \tag{3}$$

$$b_1 = S_{XY}/S_{XX} \tag{4}$$

$$b_0 = \overline{Y} - b_1 \overline{X} \tag{5}$$

$$R^2 = b_1 S_{XY}/S_{YY} \tag{6}$$

$$r = \frac{\sum (X_i - \overline{X})(Y_i - \overline{Y})}{\left(\sqrt{\sum (X_i - \overline{X})^2} \sqrt{\sum (Y_i - \overline{Y})^2}\right)}. \tag{7}$$

Definitions:

$S_{XX}$=The sum of the squares of the independent variable values.

$S_{YY}$=The sum of the squares of the dependent variable values.

$S_{XY}$=The sum of the products of the independent and dependent variable values.

X=The individual values of the independent variables.

X-bar=The mean of the independent variable values.

Y=The individual values of the dependent variables.

Y-bar=The mean of the dependent variable values.
n=The number of (X,Y) pairs.
$b_1$=The slope of the repression equations.
$b_0$=The intercept of the regression equations.
r=The sample correlation coefficient.
$R^2$=The square of the sample correlation coefficient.

Figure 5:
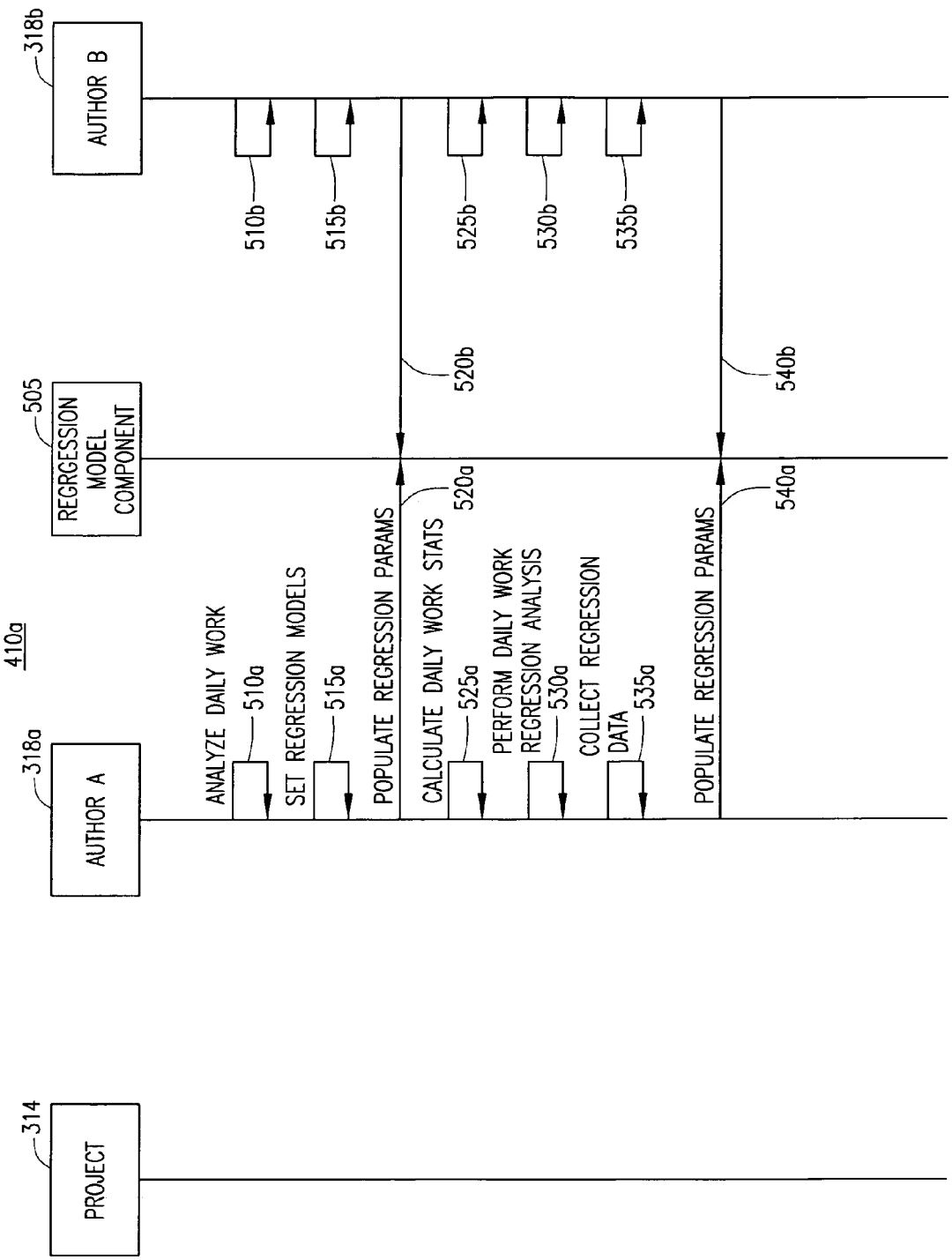
FIG. 5 is an exemplary interaction diagram for performing an analysis for work performed by an individual project team member working on the exemplary development project as identified in FIG. 4.

FIG. 5 is in an exemplary flow diagram 400 that describes general processing to determine individual and interdependency relationships based on work performed by project team members. The process starts at step 405. At step 410, individual authors generate individual work statistics. The author component 318, operates to manage a project team member's activity. Separate instances of the author component 318 allows for each project team member to be individually serviced while engaging the development project. Alternatively, a single author component 318 may service multiple project team members.

Statistics generated by the author component 318 may include generating information descriptive of work efforts on the development project. For example, information may be generated that describes the amount of time spent by an individual project team member working on branches 105 and leaves 110. Other statistical analyses for the individual project team members may be performed or initiated by the author component 318.

At step 415, a course pairwise work regression analysis is generated. The term "pairwise" describes processing performed utilizing work data stored in the project summary database 200 or elsewhere for two project team members or non-project team members. In the course pairwise work regression analysis, a determination is made to understand how the project team members are interdependently related on artifact types as a whole. More particularly, branch work and leaf work that each project team member has performed is gathered on a temporal basis, and the statistical analysis utilizing regression analysis is performed. Results from the statistical analysis may be indicative of the interdependency and/or impact relationships between the project team members working on artifacts and/or types of artifacts (e.g., branches and leaves). Such results may provide a project manager with an understanding of the level of work that two project team members are performing, and whether an interdependency relationship between the two project team members exists. Based on the results of the statistical analysis, the project manager can address the situation accordingly.

At step 420, a fine-grained pairwise work regression analysis is generated. The fine-grained work regression analysis focuses on specific artifacts worked on by the project team members rather than considering the general types of artifacts worked on by the project team members. The specific artifacts may be identified by the artifact ID's as shown in FIGS. 1 and 2. Alternatively, the specific artifacts may be identified by hash values generated by time-stamps of creation and/or modification dates.

More specifically, the fine-grained work regression analysis includes identifying specific artifacts worked on by project team members. The artifacts identified may be temporally organized so that a regression analysis may be performed to determine the interdependency and impact relationships between the project team members based on the specific artifacts worked on by one project team member with respect to other project team member(s). The fine-grained work regression analysis may be performed periodically, non-periodically, predetermined, random or pseudo-random time periods.

FIG. 5 is an exemplary interaction diagram 410a depicting a detailed process for performing the individual work analysis. The analysis may include (i) an analysis of leaf work to branch work, (ii) leaf work to total work, and (iii) branch work to total work for a development project. Other individual work analysis statistics may also be generated. Four objects related to performing the individual work analysis are shown, including the project component 314, author A 318a, author B 318b, and regression model component 505. It should be understood that the term "author" could alternatively be "editor" or any other indicator. Although not included in FIG. 3, the regression model component 505 may be contained within or external from the statistical analyzer 320. It should be understood that rather than the regression model component 505 being directly disposed between the author components 318a and 318b, the statistical analyzer 320 may communicate with the author components 318a and 318b, and the statistical analyzer 320 may communicate with the regression model component 505 thereafter.

At step 510a, author A 318a analyzes daily work performed by the project team member being handled by author A 318a. In analyzing the daily work, author A 318a searches the project summary database 200 to find artifacts (e.g., branches 105 and leaves 110) that were created and/or modified on a particular day. Other ranges of time and days may alternatively be considered by the project manager. As indicated beneath author B 318b, steps performed by author B 318b are substantially the same as those performed by author A 318a because the author component (i.e., class) is performing the analysis and each instance of the author component in an object oriented sense (i.e., authors A and B) is an instance of the author class. Of course, the data sought and processed by author B 318b pertains to a different project team member than author A 318a.

At step 515a, regression models are set as shown and discussed with respect to equations (1)–(7). Essentially, the regression models may include normal regression, slope, and intercept equations.

At step 520a, author A 318a notifies the regression model component 505 to populate the regression model with parameters as determined in step 510a. For the exemplary development project, the number of branches 105 worked on may be the independent variable "X", and the number of leaves 110 worked on may be the dependent variable "Y". Alternatively, the number of branches 105 worked on (i.e., branch tasks) and the number of leaves 110 worked on (i.e., leaf tasks) may each be regressed against the total number of tasks performed.

At step 525a, the daily work statistics are calculated. The daily work statistics includes the number of branches 105 and leaves 110 worked on by the project team member for a given day.

At step 530a, a regression analysis using the daily work parameters used to populate the regression model is performed. At step 535a, results of the regression analysis are collected. The regression model may be again populated at step 540a to perform a regression analysis to determine other statistics for the project team member.

Figure 6:
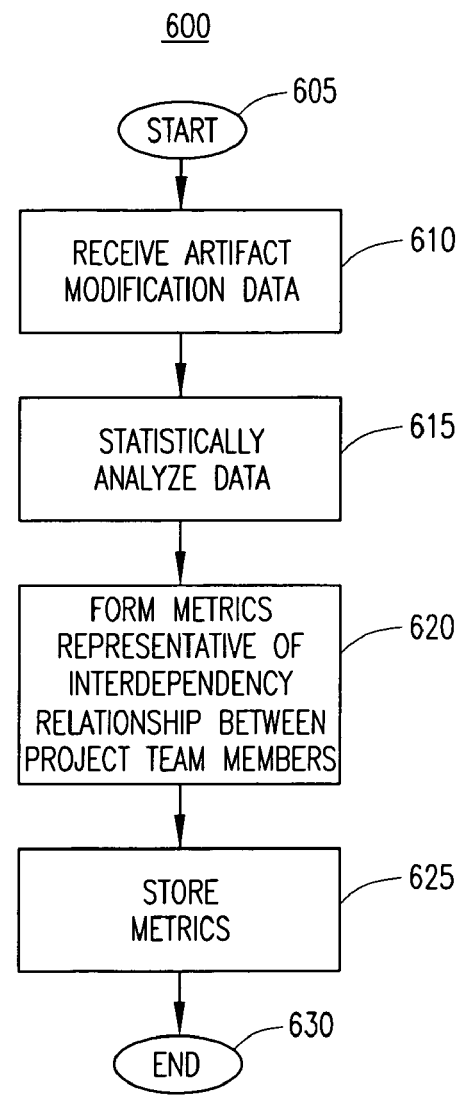
FIG. 6 is a high-level flow diagram of a pairwise work regression analysis as identified in FIG. 4.

FIG. 6 is an exemplary flow diagram 600 of a basic operation for determining interdependency and impact relationships between two project team members modifying artifacts of the project data file 301. The process starts at step 605. At step 610, data indicative of a temporal relationship between two project team members who modify an artifact of the project data file 301 is received. This data may be stored in the project summary database 200 or, alternatively, received real-time.

The data indicative of the temporal relationship between the two project team members is statistically analyzed at step 615. The statistical analysis forms metrics that are representative of the interdependency and/or impact relationships between the project team members. The metrics are stored at step 625 in the interdependency database 312. The process ends at step 630. It should be understood that the general process of FIG. 6 may be utilized for generally describing operations to perform the course and fine-grained pairwise work regression analysis as discussed in relation to FIGS. 7 and 8, respectively.

Figure 4:
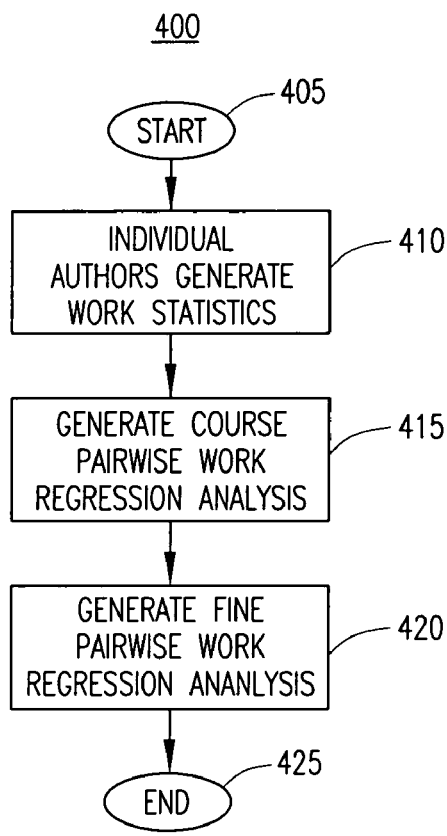
FIG. 4 is an exemplary flow diagram describing three high-level operations of the principles of the present invention as operated on the exemplary development project of FIG. 1.
Figure 7:
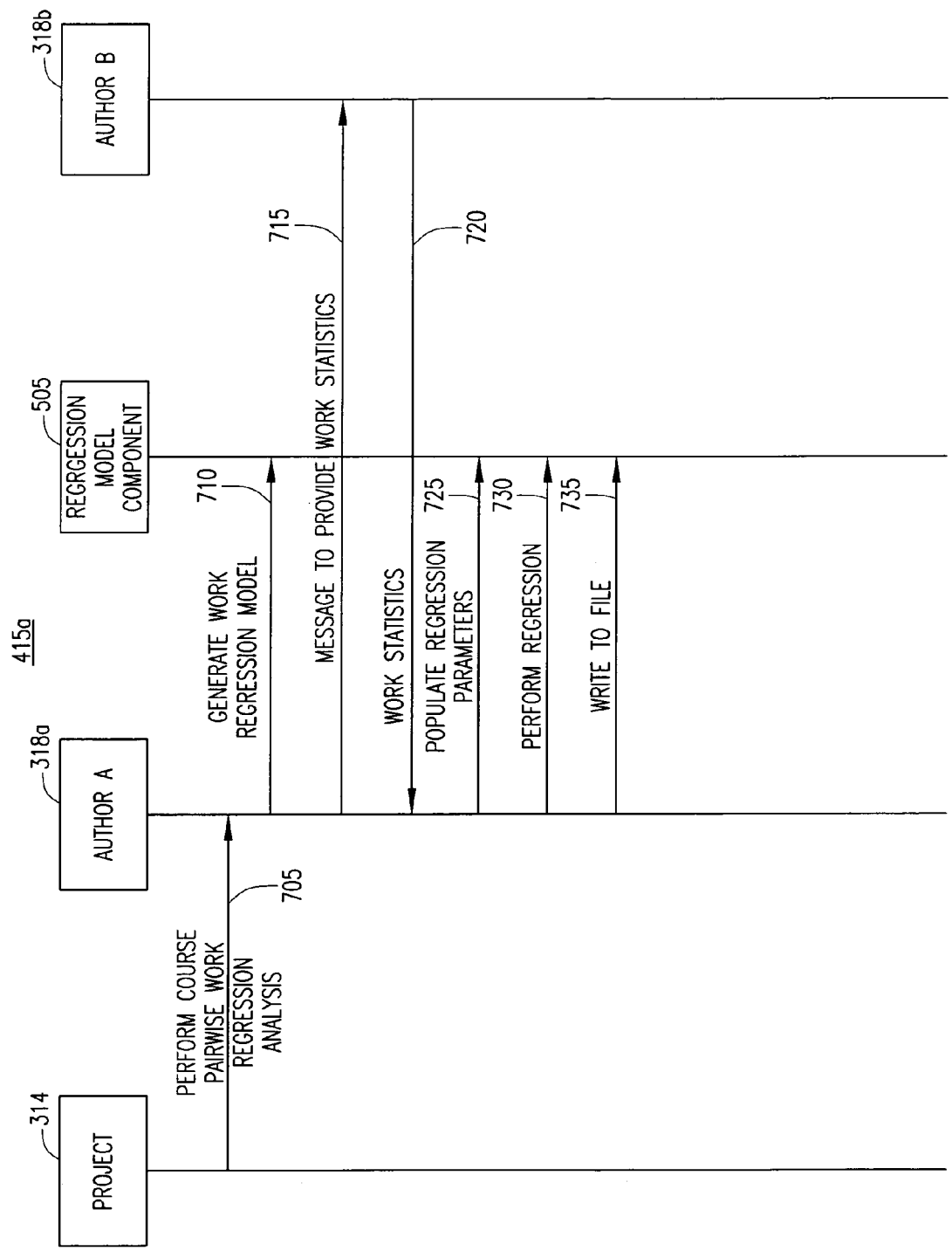
FIG. 7 is an exemplary interaction diagram of a course pairwise work regression analysis as identified in FIG. 4.

FIG. 7 is an exemplary interaction diagram 415a depicting a detailed process for performing the course pairwise work regression analysis of step 415 identified in FIG. 4. At step 705, the project component 314 instructs author A 318a to perform the course pairwise work regression analysis. Author A 318a, in turn, instructs the regression model component 505 to generate a work regression model at step 710. The work regression model may be performed by equations (1)–(7), for example, for determining the course pairwise work regression analysis.

At step 715, a message to provide work statistics is communicated from author A 318a to author B 318b. Fundamentally, each author component 318a and 318b maintains a hash table keyed to a date for work performed. Alternatively, other keys may be utilized. Author B 318b provides the work statistics data to author A 318a. Either the work statistics data or a pointer to the work statistics data may be communicated to author A 318a at step 720.

At step 725, author A 318a instructs the regression model component 505 to populate the regression model with regression model parameters. The regression model parameters are the number of branches 105 and leaves 110 worked on by the author A 318a and author B 318b. In performing a branch work-to-branch work regression analysis between the two project team members, the independent variable "X" is the number of branches 105 worked on by author A 318a, and the dependent variable "Y" is the number of branches 105 worked on by author B 318b.

At step 730, author A 318a instructs the regression model component 505 to compute the regression analysis. The results of the regression analysis are written to a file or the interdependency database 312 as step 735.

Figure 8:
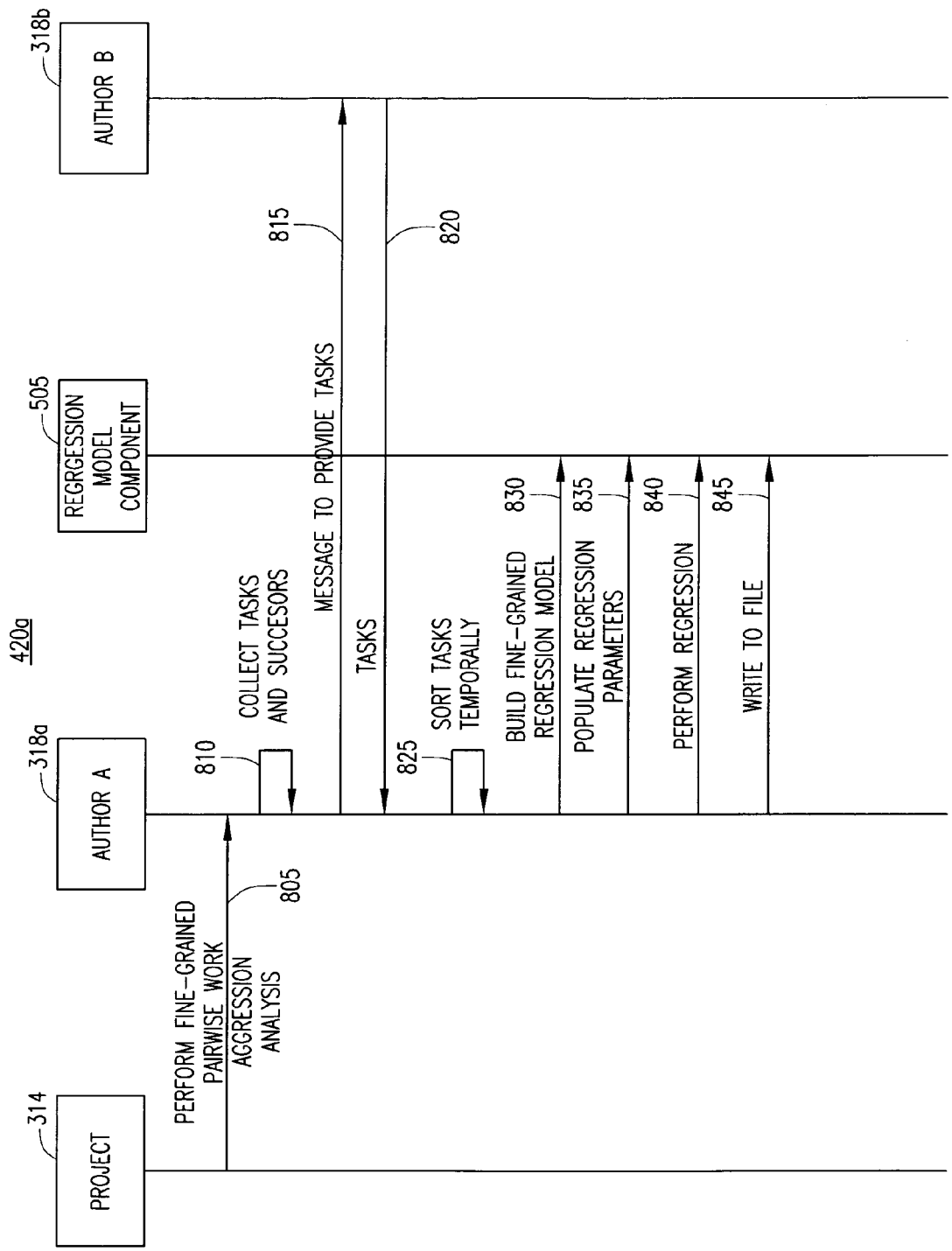
FIG. 8 is an exemplary interaction diagram of a fine-grained pairwise work regression analysis as identified in FIG. 4.

FIG. 8 is an exemplary interaction diagram 420a depicting a detailed process for performing the fine-grained pairwise work regression analysis of step 420 identified in FIG. 4. The fine-grained pairwise work regression analysis determines an interdependency and/or impact relationship between author A 318a and author B 318b based on the particular branches 105 and leaves 110 worked on by the two project team members serviced by the author components.

At step 805, the project 314 instructs author A 318a to perform the fine-grained pairwise work regression analysis. At step 810, author A 318a collects tasks performed by author A 318a and successors who performed work on those tasks. In one embodiment, author A 318a searches in the project summary database 200 to find branches 105 and leaves 110 that author A 318a has created or modified over a given time period. Additionally, author A 318a may determine successors that have performed work on the particular branches 105 and leaves 110 that were found in the search by author A 318a.

At step 815, a message is sent from author A 318a to author B 318b for author B 318b to provide tasks on particular branches 105 and leaves 110 performed by author B 318b. The list of tasks are sent from author B 318b to author A 318a at step 820. The list of tasks are temporally sorted at step 825 prior to building a fine-grained regression model at step 830. The fine-grained pairwise work regression model may utilize the same equations (1)–(7) as the course pairwise work regression model with the exception of the parameters that are used to populate in the equations at step 835.

In determining the parameters for the fine-grained pairwise work regression model, author A 318a counts the number of artifacts that the project team member associated with author A 318a worked on and counts the number of artifacts that the project team member associated with author B 318b successively worked on to form the independent variable "X" and dependent variable "Y", respectively, for individual artifacts. In other words, the independent and dependent variables may be developed based on a temporal relationship between tasks performed by author A 318a on one artifact and tasks performed on the same artifact by author B 318b, cumulatively (i.e., for all of the branches, for example, worked on by the two authors on an individual basis). It should be understood that the count technique may be used for the different types of artifacts of the development project. At step 840, a regression is performed to determine the interdependency and/or impact relationships between the two project team members associated with author A 318a and author B 318b as described by work performed on particular branches 105 and leaves 110. The results of the regression are written to the interdependency database 312 at step 845 so that a series of results may thereafter be used to chart the results.

The results of the fine-grained pairwise work regression analysis produces a more complete description of the interdependency and/or impact relationships between project team members than does the course pairwise work regression analysis. The results may be produced on a daily basis, a weekly basis, a monthly basis, or any other periodic, substantially periodic, or non-periodic time period. It should be understood that the generation of the interdependency relationships between two or more project team members may be formed by data collected on a daily basis or any other time basis as the data collector 320 (FIG. 3) may continuously or non-continuously monitor and store work performed on artifacts of the project in the project summary database 200.

Figure 9:
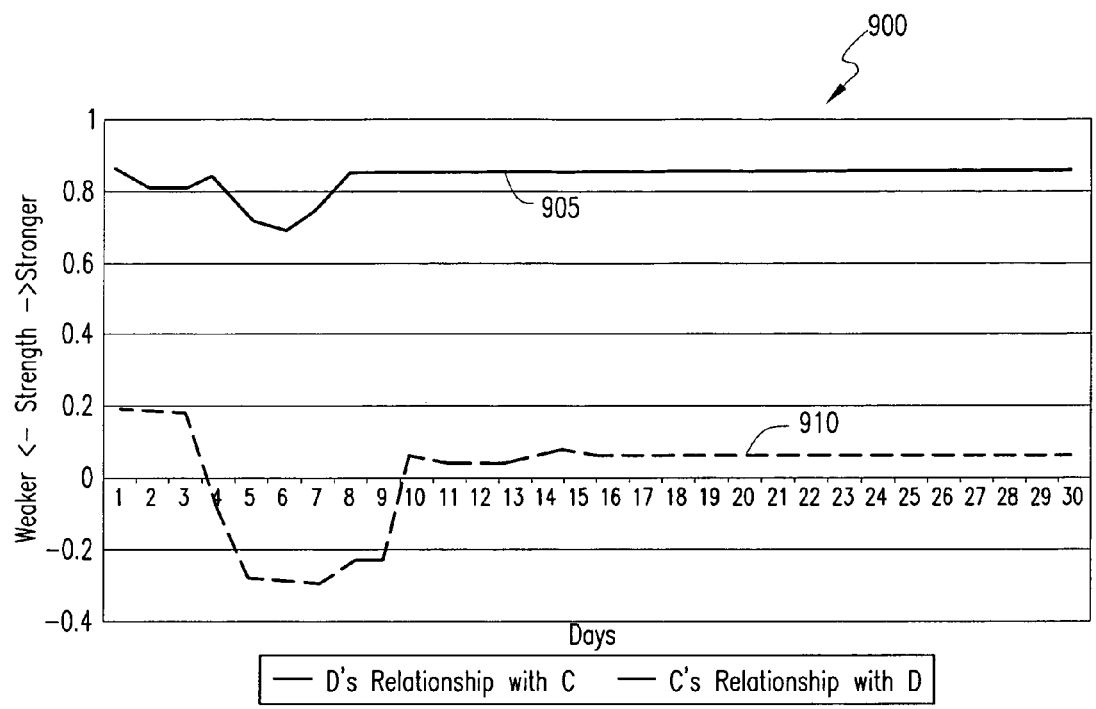
FIG. 9 is an exemplary graph produced by a pairwise regression analysis of any of FIGS. 4–8 of an interdependency relationship between two project team members.

FIG. 9 is an exemplary output graph 900 from an interdependency relationship model for two project team members. For the purposes of this example, it is assumed that the development project has a single author, C, and a single editor, D. Further, this is the first time that C and D have worked together on a development project, but both are senior project team members.

As expected, the relationship models produce a strong relationship between D and C's work as indicated by line 905. Interestingly, the first week appears to indicate a weakening in the work relationship between C and D. One factor that proves to produce this weakening relationship is that D relied on the project manager to make author-related decisions, as opposed to D's relying on C to make the author-related decisions. Additionally, differing work habits and schedules compounded the problems in the work relationship. D tended to arrive to work late and work late, while C tended to arrive to work early and leave work early. Once the two became acclimated with the other's work habits and schedules at about week 7, the strength of their working relationship improved as indicated on the line 905, which is D's interdependency relationship with C. C's interdependency relationship with D, as shown on the line 910, however, cannot be substantiated because these values (i.e., between −0.2 and +0.2) are negligible and are basically irrelevant.

The regression analysis simply provides an indication of the confidence that the regression model fits the data. The slope and intercept of the regression line may also be identified. Assuming a strong linear relationship, the slope of the line may be used to understand the amount of work that one project team member is performing in relation to another, and to provide an understanding of the ramifications of utilizing these project team members on another development project.

Figure 10:
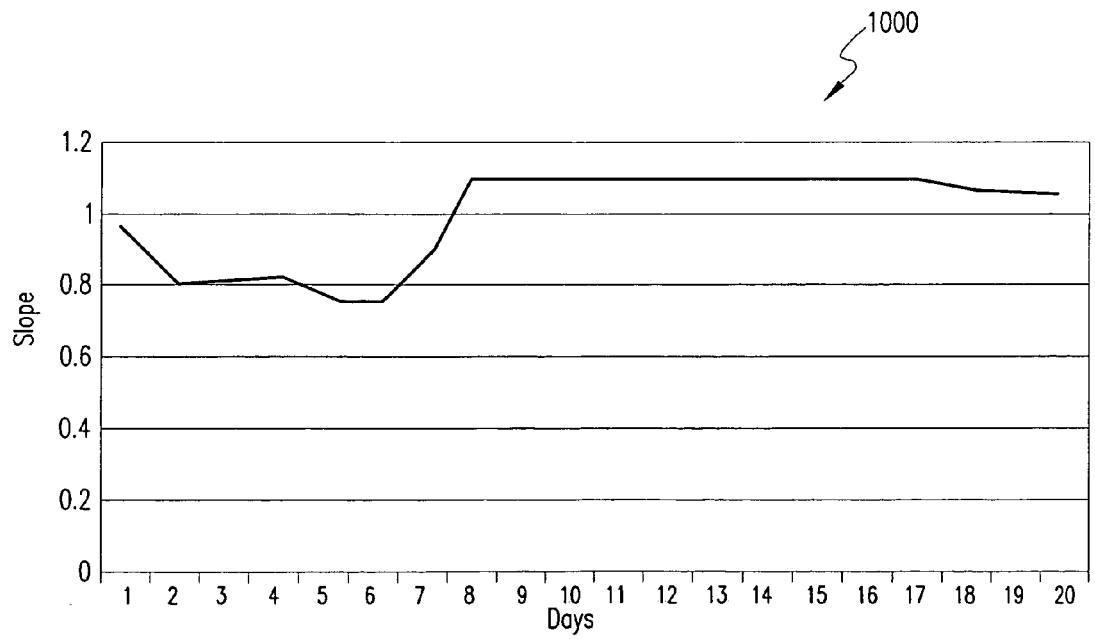
FIG. 10 is an exemplary graph depicting slope of a regression line in accordance with principles of the invention.

FIG. 10 is an exemplary graph 1000 depicting the slope of the regression line between C and D's work, where C, again, is the independent variable and D is the dependent variable. Again, this graph 1000 reflects the realities of the interdependency relationship between C and D. The daily scope indicates impact on a project team member due to work performed by another project team member. For example, for each work unit or artifact that C executes, D initially executed 20 percent fewer work units. After the sixth day, D began producing more work units and ultimately executed approximately ten percent more work units for each work unit that C executed.

The system for determining the interdependency relationships between project team members may be manual, semiautomatic, or automatic. Additionally, rather than using real numbers on the y-axis of the graphs 900 and 1000, generic language may be utilized to describe the interdependency relationship between the project team members. For example, as the results of the statistical analysis provide metrics that may be classified as being strong (e.g., 0.8) or weak (e.g., 0.2), the system may provide an analysis in a human legible description, such as, "B is very dependent on work produced by A with a certainty of 0.027." Additionally, a rule-based interpretation system may be utilized to monitor the results of the statistical analysis and provide an alert to the project manager for inefficiencies, deteriorations, or good working relationships between the project team members. TABLE 1 shows an exemplary list of relationships describing results from the quantitative analysis.

TABLE 1

| Correlation Coefficient | Definition |
| --- | --- |
| 0.5 to 0.69 | Moderately Weak Positive Correlation |
| 0.25 to 0.49 | Weak Positive Correlation |
| 0.24 to −0.24 | Negligible Correlation |
| −0.25 to −0.49 | Weak Negative Correlation |
| −0.5 to −0.69 | Moderately Weak Negative Correlation |
| −0.7 to −0.89 | Moderately Strong Negative Correlation |
| −0.9 to −1.0 | Strong Negative Correlation |

The previous description is of an embodiment for implementing the principles of the present invention, and the scope of the invention should not necessarily be limited by this description. The scope of the present invention is instead defined by the following claims.

What is claimed is:

1. A computer-network-based development-project-management method comprising:

receiving data indicative of a temporal relationship between a first and a second project team member relative to work comprising modification of at least one artifact of the development project;

receiving data indicative of an amount of work performed on the at least one artifact by the second team member as a result of work performed by the first team member on the at least one artifact;

wherein the work performed by the second team member comprises modification of the at least one artifact;

performing regression analysis on the data indicative of the temporal relationship to form at least one metric representative of the strength of an interdependency relationship between the first and second project team members;

wherein the interdependency relationship is formed as the second project team member performs work that is required due to work performed on the at least one artifact by the first project team member;

performing regression analysis on the data indicative of the amount of work performed to form at least one metric representative of an impact relationship between the first and second project team members;

wherein the at least one metric representative of the impact relationship is indicative of the amount of work performed by the second project team member as a result of work performed by the first team member on the at least one artifact;

storing the at least one metric representative of the interdependency relationship and the at least one metric representative of the impact relationship;

wherein the steps of receiving data, performing regression analysis, and storing the at least one metric representative of the interdependency relationship and the at least one metric representative of the impact relationship are performed over the computer network;

outputting data based at least in part on the at least one metric representative of the interdependency relationship and the at least one metric representative of the impact relationship; and performing a development-project task based at least in part on the output data.

2. The method according to claim 1, further comprising collecting data indicative of modifying the at least one artifact of the development project by the first and second project team members, the data including a time-stamp.

3. The method according to claim 1, wherein the at least one artifact comprises at least one of a data element and a data file.

4. The method according to claim 1, wherein the at least one metric representative of the interdependency relationship comprises at least one of the following:

a correlation coefficient, a slope, and an intercept.

5. The method according to claim 1, further comprising forming a series of the at least one metric representative of the strength of the interdependency relationship.

6. The method according to claim 5, wherein the step of forming the series comprises repeating at predetermined, random, or pseudo-random time periods the steps of receiving, performing regression analysis, and storing.

7. The method according to claim 5, further comprising outputting the series of metrics.

8. The method according to claim 1, wherein the outputting step comprises generating a human legible alphanumeric description of the at least one metric representative of the strength of the interdependency relationship and the at least one metric representative of the impact relationship.

9. A computer-network-based development-project-management system comprising:

a data collector component associated with the development project and operable to collect data indicative of a temporal relationship between a first project team member and a second project team member relative to work comprising modification of at least one artifact and an amount of work performed on the at least one artifact by the second team member as a result of work performed by the first team member on the at least one artifact;

a statistics analyzer component for performing a regression analysis on the collected data to form:
   at least one metric representative of the strength of an interdependency relationship between the first and second project team members; and
   at least one metric representative of an impact relationship between the first and second project team members;

a data repository for storing the at least one metric representative of the strength of the interdependency relationship and the at least one metric representative of the impact relationship;

wherein the interdependency relationship is formed as the second project team member performs work that is required due to work performed on the at least one artifact by the first project team member;

wherein the at least one metric representative of the impact relationship is indicative of the amount of work performed by the second project team member as a result of work performed by the first team member on the at least one artifact;

outputting data based at least in part on the at least one metric representative of the interdependency relationship and the at least one metric representative of the impact relationship; and performing a development-project task based at least in part on the output data.

10. The system according to claim 9, wherein the collected data comprises time-stamps identifying at least one artifact-modification time.

11. The system according to claim 9, wherein the at least one artifact comprises at least one of a data object and a data file.

12. The system according to claim 9, wherein at least one of the at least one metric representative of the strength of the interdependency relationship and the at least one metric representative of the impact relationship comprises a correlation coefficient.

13. The system according to claim 9, wherein the data repository is operable to store a series of the at least one metric representative of the strength of the interdependency relationship and a series of the at least one metric representative of the impact relationship.

14. A computer-network-based method of analyzing an interdependency relationship between a first and a second person working on at least one artifact, the method comprising:
   tracking modifications to the at least one artifact by the first and second person;
   storing parameters associated with the modifications to the at least one artifact by the first and second persons;
   performing at least one regression analysis based on the stored parameters;
   wherein the at least one regression analysis generates:
      at least one metric representative of the strength of a characteristic of an interdependency relationship between the first and second persons; and
      at least one metric representative of an impact relationship between the first and second project team members;
   wherein the interdependency relationship is formed as the second project team member performs work that is required due to work performed on the at least one artifact by the first project team member;
   wherein the at least one metric representative of the impact relationship is indicative of the amount of work performed by the second project team member as a result of work performed by the first team member on the at least one artifact;
   wherein the steps of tracking modifications, storing parameters, and performing the at least one regression analysis are performed over a computer network;
   outputting data based at least in part on the at least one metric representative of the interdependency relationship and the at least one metric representative of the impact relationship; and
   performing a management task based at least in part on the output data.

15. The method according to claim 14, wherein the parameters comprise time-stamps identifying times of modifications to the at least one artifact by the first and second persons.

16. The method according to claim 14, wherein the at least one artifact is associated with a development project.

17. The method according to claim 14, wherein the parameters are stored in a table.

18. The method according to claim 17, wherein the table is a hash table.

19. The method according to claim 17, wherein the table comprises at least one key associated with each of the at least one artifact.

20. The method according to claim 17, wherein the at least one artifact comprises at least one of a data object and a data file.

21. The method according to claim 14, wherein the computer network comprises at least one of the following: a local area network, a wide area network, and the Internet.

22. A computer-readable medium having stored thereon sequences of instructions, the sequences of instructions including instructions, when executed by a processor, causes the processor to:
   receive data indicative of a temporal relationship between a first and a second project team member relative to work comprising modification of at least one artifact of the development project;
   receive data indicative of an amount of work performed on the at least one artifact by the second team member as a result of work performed by the first team member on the at least one artifact;
   wherein the work performed by the second team member comprises modification of the at least one artifact;
   perform regression analysis on the data indicative of the temporal relationship to form at least one metric representative of the strength of an interdependency relationship between the first and second project team members;
   wherein the interdependency relationship is formed as the second project team member performs work that is required due to work performed on the at least one artifact by the first project team member;
   perform regression analysis on the data indicative of the amount of work performed to form at least one metric representative of an impact relationship between the first and second project team members;
   wherein the at least one metric representative of the impact relationship is indicative of the amount of work performed by the second project team member as a result of work performed by the first team member on the at least one artifact;

store the at least one metric representative of the interdependency relationship and the at least one metric representative of the impact relationship;

wherein the steps of receiving data, performing regression analysis, and storing the at least one metric representative of the interdependency relationship and the at least one metric representative of the impact relationship are performed over the computer network;

output data based at least in part on the at least one metric representative of the interdependency relationship and the at least one metric representative of the impact relationship; and perform a development-project task based at least in part on the output data.

23. The computer-readable medium according to claim 22, further comprising instructions that cause the processor to collect data indicative of modifying the at least one artifact of the development project by the first and second project team members, the data including a time-stamp.

24. The computer-readable medium according to claim 22, wherein the at least one artifact comprises at least one of a data element and a data file.

25. The computer-readable medium according to claim 22, wherein the at least one metric representative of the interdependency relationship comprises at least one of the following:

a correlation coefficient, a slope, and an intercept.

26. The computer-readable medium according to claim 22, further comprising instructions that cause the processor to form a series of the at least one metric representative of the strength of the interdependency relationship.

27. The computer-readable medium according to claim 26, wherein the instructions that cause the processor to form the series comprise instructions that cause the processor to repeat at predetermined, random, or pseudo-random time periods receiving, performing regression analysis, and storing.

28. The computer-readable medium according to claim 26, further comprising instructions that cause the processor to output the series of metrics.

29. The computer-readable medium according to claim 22, wherein the instructions that cause the processor to output step comprise instructions that cause the processor to generate a human legible alphanumeric description of the at least one metric representative of the strength of the interdependency relationship and the at least one metric representative of the impact relationship.

* * * * *